US006834027B1

United States Patent
Sakaguchi et al.

(10) Patent No.: US 6,834,027 B1
(45) Date of Patent: Dec. 21, 2004

(54) SURFACE PLASMON-ENHANCED READ/ WRITE HEADS FOR OPTICAL DATA STORAGE MEDIA

(75) Inventors: Mitsuhito Sakaguchi, Princeton, NJ (US); Tineke Thio, Princeton, NJ (US); Richard A. Linke, Princeton, NJ (US); Thomas W. Ebbesen, Strasbourg (FR); Henri J. Lezec, Strasbourg (FR)

(73) Assignee: NEC Laboratories America, Inc., Princeton, NJ (US)

( * ) Notice: Subject to any disclaimer, the term of this patent is extended or adjusted under 35 U.S.C. 154(b) by 976 days.

(21) Appl. No.: 09/721,694

(22) Filed: Nov. 27, 2000

Related U.S. Application Data

(60) Provisional application No. 60/185,239, filed on Feb. 28, 2000.

(51) Int. Cl.[7] ............................ G11B 11/00; G02B 6/10; H11J 3/14
(52) U.S. Cl. ............................... 369/13.32; 369/112.27; 385/129; 250/216
(58) Field of Search .......................... 369/13.32, 44.37, 369/112.26, 44.2, 44.38, 112.27, 300, 13.33; 250/216, 201.3, 307, 234; 359/738; 385/129, 146

(56) References Cited

U.S. PATENT DOCUMENTS

| | | | | |
|---|---|---|---|---|
| 5,199,090 A | * | 3/1993 | Bell | ............................ 385/33 |
| 5,598,387 A | * | 1/1997 | Pohl | ........................ 369/44.37 |
| 5,846,843 A | | 12/1998 | Simon | ........................ 436/527 |
| 6,040,936 A | * | 3/2000 | Kim et al. | ................... 359/245 |
| 6,052,238 A | * | 4/2000 | Ebbesen et al. | ............ 359/738 |
| 6,236,033 B1 | * | 5/2001 | Ebbesen et al. | ............ 250/216 |
| 6,285,020 B1 | * | 9/2001 | Kim et al. | ................... 250/216 |

FOREIGN PATENT DOCUMENTS

| | | |
|---|---|---|
| JP | 05-034129 | 2/1993 |
| JP | 07-093797 | 4/1995 |
| JP | 08-007323 | 1/1996 |
| JP | 08-222814 | 8/1996 |
| JP | 09-145603 | 6/1997 |
| JP | 10-143895 | 5/1998 |
| JP | 11-134696 | 5/1999 |

* cited by examiner

*Primary Examiner*—Ali Neyzari

(57) ABSTRACT

A read/write head for an optical storage medium is provided. The read/write head comprises a waveguide having an end face and a plasmon-enhanced device provided on the end face of the waveguide. The plasmon-enhanced device comprises a metal film having a first surface and a second surface, the first surface being fixed to the waveguide end face, the metal film having an aperture provided therethrough. The metal film has a periodic surface topography provided on at least one of the first and second surfaces of the metal film. Light incident on one of the surfaces of the metal film interacts with a surface plasmon mode on at least one of the surfaces of the metal film thereby enhancing transmission of light through the aperture in the metal film which is directed onto and/or collected from the optical storage medium. A read/write head with an integral light source is also provided. The invention also provides an array of precisely aligned read/write heads, and an array of precisely aligned read/write heads with integral light sources, as well as side-emitting lasers and vertical cavity surface emitting lasers (VCSELs) with enhanced transmission.

77 Claims, 6 Drawing Sheets

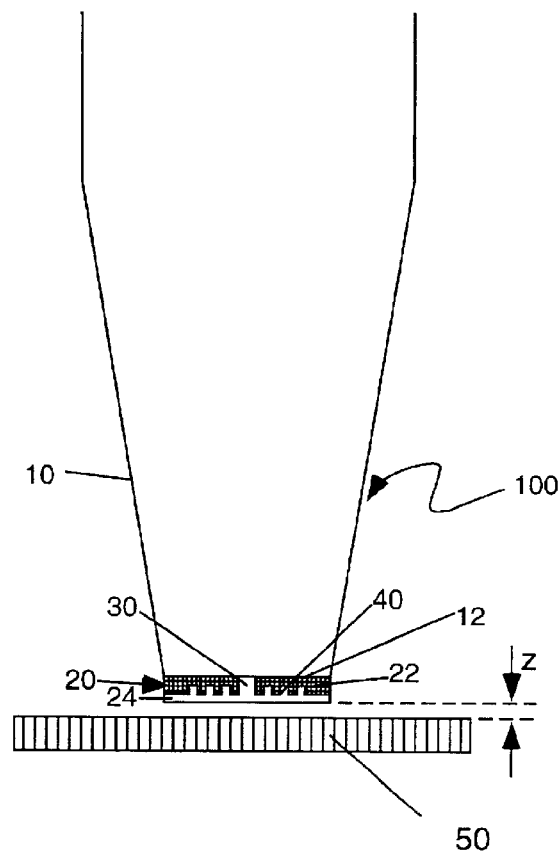
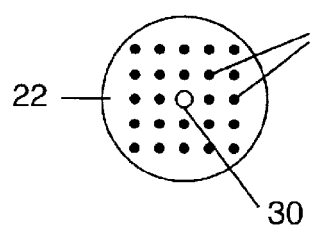 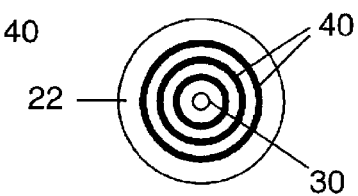 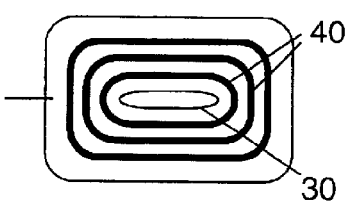
FIG. 1A
FIG. 1B  FIG. 1C  FIG. 1D

SURFACE PLASMON-ENHANCED READ/WRITE HEADS FOR OPTICAL DATA STORAGE MEDIA

CROSS-REFERENCE TO RELATED APPLICATIONS

This application claims the benefit of U.S. Provisional Application No. 60/185,239 filed Feb. 28, 2000.

FIELD OF THE INVENTION

The present invention relates to the field of data storage devices, and in particular to a read/write device for optical data storage devices utilizing surface plasmon-enhanced optical transmission through subwavelength apertures in metal films, which offers very high throughput and resolution.

BACKGROUND OF THE INVENTION

As discussed in detail in U.S. Pat. No. 5,973,316 to Ebbesen et al., U.S. Pat. No. 6,040,936 to Kim et al., U.S. Pat. No. 6,052,238 to Ebbesen et al., U.S. Pat. No. 6,236,033 to Ebbesen et al., and U.S. Pat. No. 6,285,020 to Kim et al. (each of these patents being incorporated herein by this reference), light transmission through one or more subwavelength-diameter apertures provided in a thin metal (i.e. conductive and opaque in the wavelength of interest) film can be greatly enhanced by arranging the apertures in a periodic array and/or by providing a periodic surface topography on the metal film (surface features such as dimples or protrusions) in conjunction with the aperture(s). This enhancement, which can be as large as a factor of 1,000, occurs when light incident on the conductive film interacts resonantly with a surface plasmon mode.

Optical storage disks, such as CD-ROM and DVD, are becoming increasingly attractive data storage media because of their high data densities, compact design, portability and robustness, and particularly because both the media and the writing devices are becoming less expensive. Notwithstanding the relatively high data densities offered by optical disks, still higher densities are perceived as desirable. However, in order to increase densities beyond the present values it is necessary to reduce the size of the optical beam that writes and reads the data. This has proven to be impractical without also drastically reducing the writing and reading beam strength and thus making data storage impossible. Furthermore, such optical disks typically exhibit a significant drawback in the sense that the read rates (that is the rate at which data can be read from the optical disk) are relatively low.

The present invention redresses both problems by providing an optical read/write head which permits reading and/or writing of subwavelength-scale features on optical disks at extremely high power throughputs despite the high resolution, thereby allowing for linear data densities (and therefore reading and writing rates) far higher than those allowed by the diffraction limit. (When using lenses or other far-field focusing devices to focus a light beam, the size of the convergent light "spot" at the focus is limited by diffraction to a diameter $\lambda/2$ (where $\lambda$ is the optical wavelength), a phenomenon known as the diffraction limit.) Smaller spots result in higher data storage density on the optical storage medium, which in turn results in higher data read rates for a given rotational velocity of the medium. Multichannel reading and/or writing through a linear array of such read/write heads further increases the data transfer rates. Furthermore, these advantages are achieved without resorting to lasers with smaller wavelengths than are currently commercially available, so the invention offers practical application with off-the-shelf laser equipment.

Rewriteable CD-ROM optical disks commercially in use at the present time store their data as "pits" on tracks on a phase-change medium. The tracks have a pitch of 1.6 $\mu$m; the pit length varies between 0.4 $\mu$m–1.2 $\mu$m, the lower limit being given by the diffraction limit of the lasers currently in use (~780 nm for CD-ROM) since both writing and read-out occurs in the far-field, using fairly large lenses for the focusing and collection optics. Higher data densities are achieved by stacking multiple layers of storage media. Currently available DVD disks contain up to about 8 times the data of a standard CD-ROM (which contains 0.65 GB). Even though it is desirable to obtain even higher data densities, a more acute problem is the rates at which the data is read, which is currently limited by the mechanical stability of the disk rotation, and thus by the rotation speed of the disk.

To alleviate these problems, it is desirable to reduce the pit length of such optical data storage media significantly. If far-field optics are used (wherein the distance between the read/write head and the optical storage medium is much larger than the wavelength of light), the minimum pit length is given by the diffraction limit. For instance, switching to a blue-green laser would allow pit lengths of about 300 nm.

However, if near-field optics can be used (wherein a read/write head with a subwavelength-sized aperture is scanned at a height of about a few tens of nanometers above the optical storage medium) to read and/or write the data to the optical data storage medium, then the pit length (which is then limited only by the size of the read/write aperture) can be 50 nm or smaller, resulting in higher data densities as well as significantly higher writing and/or reading rates. These advances are achieved even if conventional red or even infra-red diode lasers are used, which can be made cheaply, reliably and in mass quantities. An added advantage is that the direct coupling into optical fibers or semiconductor waveguides for a near-field read/write head precludes the use of bulky and heavy collector lenses which may simplify the mechanical design of the flyhead or contact head. With such small apertures, however, the transmission through a conventional near-field device, such as a tapered optical fiber tip, suffers from severe attenuation, the result of which is a signal-to-noise ratio which is too low for reading and a lack of the high intensities necessary for writing. See E. Betzig et al., "Near-Field Optics: Microscopy, Spectroscopy, and Surface Modification Beyond the Diffraction Limit," Science, Vol. 257, pp. 189–194 (1992); G. A. Valaskovic et al., "Parameter Control, Characterization, and Optimization in the Fabrication of Optical Fiber Near-Field Probes," Applied Optics, Vol. 34, No. 7, pp. 1215–1227 (1995). As a result, practical optical data storage read/write heads using near-field optics have not heretofore been available.

Accordingly, there is a need for a read/write head for optical data storage media using near-field optics which provides for reduced pit length size and therefore high data density and high read/write rates, and which does not suffer from severe attenuation and therefore allows both writing and reading of data on the optical storage medium, such as a phase-change medium.

SUMMARY OF THE INVENTION

Generally speaking, in accordance with the invention, a read/write head for an optical storage medium is provided.

The read/write head comprises a waveguide having an end face and a plasmon-enhanced device provided on the end face of the waveguide. The plasmon-enhanced device comprises a metal film having a first surface and a second surface, the first surface being fixed to the waveguide end face, the metal film having an aperture provided therethrough. The metal film has a periodic surface topography provided on at least one of the first and second surfaces of the metal film. Light incident on one of the surfaces of the metal film interacts with a surface plasmon mode on at least one of the surfaces of the metal film thereby enhancing transmission of light through the aperture in the metal film which is directed onto and/or collected from the optical storage medium. A read/write head with an integral light source is also provided.

In addition, an array of precisely aligned read/write heads for an optical storage medium is also provided. The array comprises a plurality of waveguides, each waveguide having an end face, and all end faces being positioned substantially in the same plane, and a plasmon-enhanced device provided on the end face of each waveguide. Each plasmon-enhanced device comprises a metal film having a first surface and a second surface, the first surface being fixed to the corresponding waveguide end face, the metal film having an aperture provided therethrough. The metal film has a periodic surface topography provided on at least one of the first and second surfaces of the metal film. Light incident on one of the surfaces of the metal film interacts with a surface plasmon mode on at least one of the surfaces of the metal film thereby enhancing transmission of light through the aperture in the metal film which is directed onto and/or collected from the optical storage medium. An array of precisely aligned read/write heads with integral light sources is also provided.

Furthermore, inventive side-emitting lasers and vertical cavity surface emitting lasers (VCSELs) with enhanced transmission are also provided.

Thus, read/write heads with high resolution for optical storage media are provided. The read/write heads typically utilize near-field optics. In particular, the read/write heads are provided with a subwavelength aperture which permits the pit length on the optical storage medium to be reduced, thereby providing high data density and higher data throughput at a selected scanning speed than prior art optical read/write heads. Importantly, the optical transmission through the sub wavelength aperture in the inventive read/write head is enhanced by an interaction with surface plasmons by use of a plasmon-enhanced device (hereinafter "PED"). The end face of the waveguide of the read/write head is covered with a metal film through which a subwavelength aperture transmits light, either in emission mode or in collection mode (or both). The enhanced transmission is the result of a resonant interaction of the light used to read or write the optical storage media and surface plasmons on the surface of the metal film of the read/write head. The resonance can be tuned to the desired wavelength by the design of surface topology of the metal film. The resolution of the device is determined by the diameter of the aperture. The transmission through the read/write head of the present invention can exceed unity (when normalized to the power incident on the area of the read/write aperture), even when the diameter of the read/write aperture is significantly smaller than the optical wavelength. See Ebbesen et al., supra; T. Thio et al., "Surface-Plasmon Enhanced Transmission Through Hole Arrays in Cr Films," *Journal of the Optical Society of America B*, Vol. 16, No. 10, pp. 1743–1748 (1999).

Accordingly, an object of the present invention is to provide a read/write head for optical storage media which provides enhanced light transmission.

Another object of the present invention is to provide a read/write head for optical storage media which uses near-field optics.

A further object of the present invention is to provide a read/write head for optical storage media which reduces the pit length size on the optical storage media and therefore provides high data density and high read/write rates.

A still further object of the present invention is to provide a read/write head for optical storage media which does not suffer from severe attenuation and therefore allows both writing and reading of data on the optical storage medium.

A still further object of the present invention is to provide an array of read/write heads for optical storage media which are precisely aligned and provide enhanced light transmission.

Other objects of the present invention will become more readily apparent in light of the following description in conjunction with the accompanying drawings.

BRIEF DESCRIPTION OF THE DRAWINGS

FIG. 1A is a cross-sectional view (not necessarily to scale) of a read/write head of the present invention including a tapered optical fiber with a PED fabricated at its end face;

FIG. 1B is a plan view of a first exemplary embodiment of a PED useful for the read/write head of the present invention, in which the PED includes a surface topography comprising a square array of dimples surrounding a single subwavelength circular aperture;

FIG. 1C is a plan view of a second exemplary embodiment of a PED useful for the read/write head of the present invention, in which the PED includes a surface topography comprising concentric rings of dimples (grooves) surrounding a single subwavelength circular aperture;

FIG. 1D is a plan view of a third exemplary embodiment of a PED useful for the read/write head of the present invention, in which the PED includes a surface topography comprising a groove pattern surrounding a subwavelength slit;

DETAILED DESCRIPTION OF THE PREFERRED EMBODIMENTS

Figure 2:
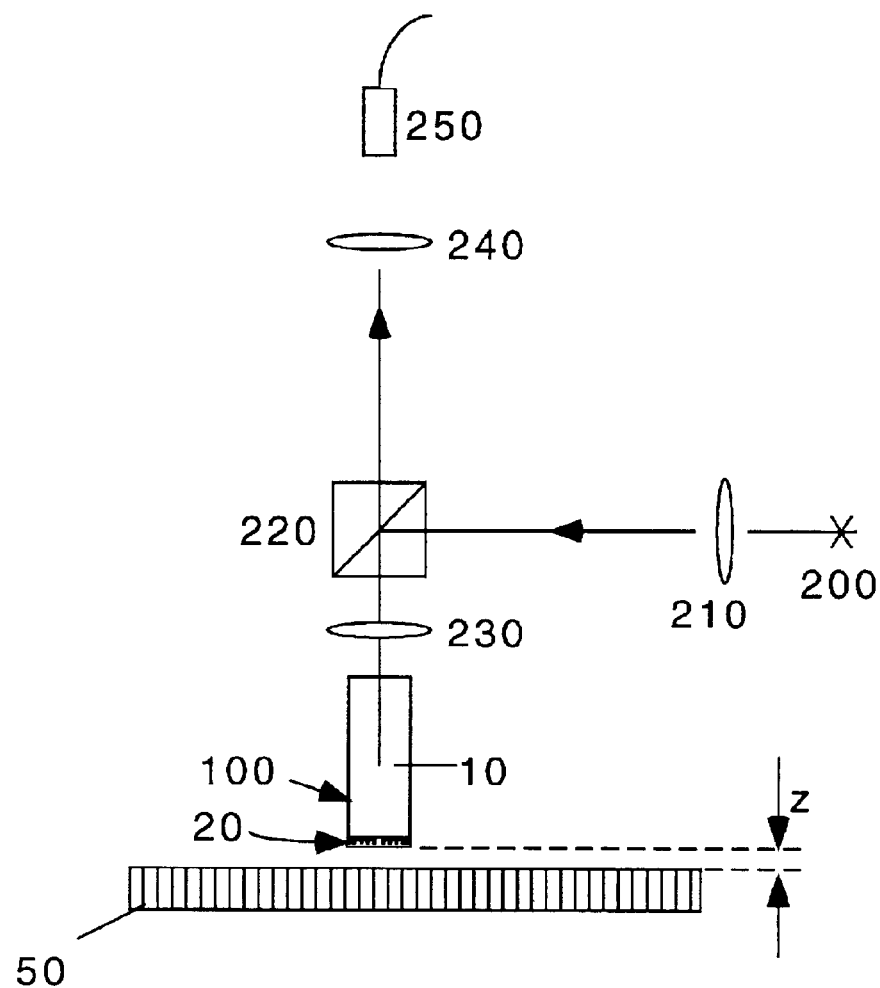
FIG. 2 is a schematic diagram of an exemplary optical path for the read/write head of the present invention.

Referring now to the drawings, FIG. 1A illustrates a read/write head 100 of the present invention for writing to and/or reading from optical storage media. As used herein, "optical storage media" means any media in which data is written to and/or read from the media using light, and includes but is not limited to phase change media such as used in optical disks such as DVD and CD-ROM as well as other forms of optical media such as optical tape or magneto-optical materials (in the case of magneto-optical materials, only reading is performed optically while writing is performed magnetically). Further, as used herein, "read/write head" means a device which stores data on optical storage media ("write") and/or retrieves data stored on optical storage media ("read"). Read/write heads of the present invention may permit reading only, writing only, or both reading and writing.

The read/write head 100 shown in FIG. 1A includes a waveguide 10 and a plasmon-enhanced device ("PED") 20. The waveguide 10 preferably comprises an optical fiber, although waveguide 10 may also comprise any other suitable waveguide for guiding light as known in the art, such as waveguides constructed on a semiconductor substrate. The waveguide 10 is provided with an end face 12, which is positioned in close proximity during reading and/or writing to the optical storage medium 50 from which data is to be read and/or to which data is to be written. The waveguide 10 may be tapered so as to minimize the area at the end face 12 of the read/write head 100, which may be desirable to maintain the read/write head within a required subwavelength distance z from the surface of the optical storage medium 50. The distance z should be of order the aperture diameter, preferably, z is less than or equal to about 1.5 times the aperture diameter. Values of z greater than about 1.5 times the aperture diameter result in diffraction of the beam and the resolution is lost. In addition, minimizing the area of the waveguide end face minimizes the total roughness on that area, including effects like skew. For example, it is mechanically easier to keep a waveguide end face within 50 nm of a surface if it is 500 nm across than if it is 5 mm across.

As noted above, read/write head 100 also includes a PED 20. The PED 20 is provided on the end face 12 of waveguide 10 and enhances the transmitted intensity of light which passes through it, whether the light travels from the waveguide 10 toward the optical storage medium 50, or in the reverse direction from the optical storage medium 50 into the waveguide 10. The PED 20 comprises a metal film 22, preferably silver, with a through aperture 30, the dimensions of which determine the resolution of the device. The aperture 30 has a diameter d which is preferably less than the wavelength of light incident on the aperture (that is, the aperture preferably has subwavelength diameter). The resolution of the read/write head should preferably match (that is, be approximately equal to) the size of the pits on the optical storage media. Finer resolution of both the pit size and the read head is preferable, but there are limits to such resolution, such as the resolution of the optical storage media itself, and the total intensity of the light traveling through the read/write head. Practically speaking, for reading, the signal-to-noise ratio must be high enough to obtain a reasonable error rate (keeping in mind that considerable error correction is usually performed using a digital signal processor, often integral to the read/write head). A more stringent practical requirement applies to the intensity of light for writing. In the case of a phase change optical storage medium, the intensity for writing needs to be high enough to locally melt the medium (e.g. turning it from crystalline to amorphous).

The metal film 22 is also provided with a periodic surface topography 4U on at least one of the two surfaces of the metal film 22 (the two surfaces being a first surface adjacent to the end face 12 of waveguide 10, and a second surface opposite the first surface which faces the optical storage medium 50). The periodic surface topography 40 may be provided on either or both of the two surfaces of the metal film 22, although it is believed to be preferable for the surface features 40 to be provided only on the first surface of the metal film 22 adjacent to the end face 12 of waveguide 10. The periodic surface topography 40 includes raised and/or depressed regions (as opposed to a substantially smooth surface) known as surface features, wherein such surface features are arranged with a periodicity or in a regularly repeated pattern. The periodicity of the surface features is important for determining the wavelength of the enhanced light collection, and is described in further detail in U.S. Pat. No. 6,236,033 to Ebbesen et al. See also Grupp et al., supra. Examples of a periodic surface topography 40 are a square array of dimples or semi-spherical protrusions as shown in FIG. 1B, or a set of concentric raised or depressed rings as shown in FIG. 1C, of which the lattice constant (FIG. 1B) or the radii (FIG. 1C) are tuned to the wavelength of the read/write laser used in conjunction with the read/write head 100. See U.S. Pat. No. 6,236,033 to Ebbesen et al.; Grupp et al., supra; H. F. Ghaemi et al., "Surface Plasmons Enhance Optical Transmission Through Subwavelength Holes," *Physical Review B*, Vol. 58, No. 11, pp. 6779–6782 (1998). The above exemplary periodic surface topographies are merely examples and do not limit the invention. Rather, other arrangements of periodic surface topography 40 are also possible and are encompassed by the invention. With this arrangement, light incident on one of the surfaces of the metal film interacts with a surface plasmon mode on at least one of the surfaces of the metal film thereby enhancing transmission of light through the aperture in the metal film.

The aperture 30 in PED 20 may be circular, but may also be rectangular or oval or have another shape to match the track pitch and the minimum pit length of the optical storage medium 50. For example, FIG. 1D shows a PED with an aperture 30 having a generally oval slit shape, together with a periodic surface topography 40 comprising concentric rounded rectangular raised or depressed rings. If a slit is used, and the slit length (the length being the longest dimension of the slit) is larger than one half the optical wavelength of the light transmitted through the PED, 20, resonances and waveguide modes inside the slit itself also cause enhanced optical-transmission. See J. A. Porto et al., "Transmission Resonances on Metallic Gratings with Very Narrow Slits," *Physical Review Letters*, Vol. 83, No. 14, pp. 2845–2848 (1999). With a slit-shaped aperture, the slit width (the width being the shortest dimension of the slit) is preferably less than the wavelength of light incident on the aperture (that is, the slit width, which comprises the aperture diameter in this case, is subwavelength). In addition, the preferred orientation is for the slit to have its longest dimension be perpendicular to the data tracks, in order to maximize read rates.

As shown in FIG. 1A, an overlayer 24 is so preferably provided on the second surface of the metal film 22 of the PED 20 (that is, the surface of metal film 22 facing the optical storage medium 50), although such an overlayer 24 is not required. The overlayer 24 comprises an optically transparent dielectric material. Overlayer 24 may protect the read/write head 100, and in particular the PED 20, from damage caused by striking the surface of optical storage medium 50 or otherwise. Moreover, overlayer 24 may provide further enhanced optical transmission through PED 20. Specifically, by selecting a material for overlayer 24 which has a refractive index which is substantially equal to that of waveguide 10, the total transmission through the PED is further enhanced. For example, if the waveguide 10 is an amorphous silica optical fiber, the overlayer 24 could also be made of amorphous silica so as to have a refractive index which is substantially equal to that of the waveguide. Experimentally, this further enhancement with a refractive index-matching overlayer 24 has been demonstrated to boost the optical transmission through the PED 20 by an additional factor of 10. This effect is described in further detail in U.S. Pat. No. 6,285,020 to Kim et al. See also A. Krishnan et al., "Enhanced Light Transmission by Resonance Tunneling Through Subwavelength Holes," NEC Research Institute, Inc. Technical Report No. 99152 (1999). Further, the material comprising overlayer 24 is preferably mechanically hard and is preferably suited to absorb without failure the temperature rise which usually accompanies an unintended "crash" (i.e. mechanical contact) of the read/write head with the optical storage medium.

The read/write head 100 of the present invention operates as a light emitter and collector, and therefore operates in both emission and collection modes as is understood in the art. That is, the read/write head operates as a light source in emission mode (thereby illuminating the optical storage medium 50) and as a light collector in collection mode (thereby collecting light emitted from, reflected by, refracted by or transmitted through the optical storage medium 50). The optical transmission through the read/write head 100 of the present invention is high both in emission and collection modes, and the read/write head 100 of the present invention may be used in both modes simultaneously.

FIG. 2 schematically illustrates one example of the optical path of the light used to read the optical storage medium 50 on which data is recorded as a modulation of the reflectivity of the medium. In this illustration, the read/write head 100 of the present invention is used in both emission and collection modes simultaneously. Light from a light source 200 (typically a semiconductor laser, but any light source is encompassed by the invention) is directed, typically using a lens 210, via a beam splitter 220 and a fiber coupler 230 into the waveguide 10 of the read/write head 100. The PED 20 of the read/write head 100 is scanned in close proximity to the optical data storage medium 50. The optical data storage medium 50 reflects the light transmitted through the PED 20, and the reflected light is then collected by the same device, first being collected through PED 20, then transmitted through the waveguide 10 and then, having passed through the beam splitter 220 and typically through a focusing lens 240, the light is collected by the detector 250. (The lenses 210, 230 and 240 may be omitted by using fiber optic waveguides to direct the light as is known in the art) The output of the detector is typically fed to a digital signal processing unit (not shown) as is known in the art.

To further boost the data transfer rate, an array of read/write heads 100 may be used. The data transfer rate is thereby increased by a factor N, where N is the number of read/write heads in the array. An array of read/write heads is also extremely useful in conjunction with optical tape, an alternative optical storage technology in which the data is written in tracks which are generally perpendicular to the length of the tape, and read or written by scanning the read/write head across (and in close proximity to) the tape. See W. S. Oakley, "A Novel Digital Optical Tape Recorder," *Proceedings of the SPIE, Vol.* 2604, pp. 25&262 (1996). A linear array of read/write heads improves the read and write rates, and also considerably simplifies the mechanical design of the control mechanism for positioning the heads since the need for lateral motion is eliminated (in the case of optical tape, for example). In practice, N will be limited by the mechanical requirements of the read/write head array. In prior art devices, the biggest challenge is to keep all N read/write heads within a distance $z \leq z_{max}$ (see FIG. 2) of the surface of the optical storage medium, where $z_{max}$ is of order the pit length (typically about 50 nm). For reference, fly-heads used for reading magnetic media are positioned at a distance about 30 nm above the magnetic media (this distance may soon be reduced to about 10 nm with newer technologies, and proposals have been made for systems utilizing a distance of about 5 nm with contact slider magnetic heads). Prior art devices attempt to utilize an array of tapered optical fibers which need to be accurately aligned at their tapered ends. The difficulties in obtaining such precise alignment of disparate optical fiber ends are considerable.

Figure 3A:
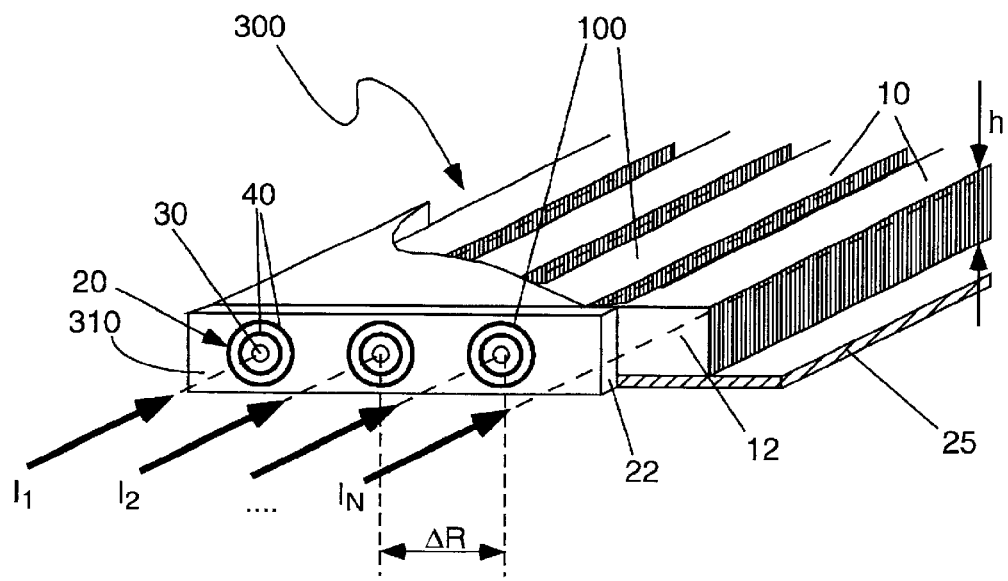
FIG. 3A is a perspective view, shown partially in cutaway, of an array of read/write heads monolithically fabricated on single wafer in accordance with the present invention.

When using an array of read/write heads, it is also important to align the multiple read/write heads with respect to one another. This issue can be addressed by fabricating the array of read/write beads on a semiconductor wafer. See U.S. Pat. No. 5,646,051 to Solin et al., which is hereby incorporated herein by this reference. FIG. 3A illustrates such a linear array 300 of read/write heads 100 formed from a single semiconductor wafer. Waveguides 10 are fabricated from the semiconductor wafer by optical lithography as is well-known in the art. The waveguides have a height h, which is preferably at least about half the wavelength of light traveling through the waveguide (i.e. $\lambda/2$), but also depends on the difference of refractive indices between the waveguide and the surrounding medium (e.g. air) as is known in the art. Laser diodes (not shown) for illuminating the data tracks on the optical storage medium, as well as the read/write heads themselves, may also be fabricated on the same semiconductor wafer as is known in the art for a completely monolithic design which eliminates the need for the otherwise difficult alignment of the lasers to the waveguides. Cleaving the waveguide faces 12 results in smoothness on the atomic scale. Upon each cleaved waveguide end face 12, a metal film 22, preferably silver, is evaporated or sputtered and subsequently patterned to have a periodic surface topography 40 as described above and a single aperture 30 through the metal film 22 is sited at the axial center of each waveguide 10, so as to form a plurality of PED's 20, each PED 20 being in register with a single waveguide 10. Although in FIG. 3A the apertures 30 are shown to be circular, other geometries may be preferable as described above. The read/write head array 300 includes an array face 310, comprising the outer surface of metal film 22 and the PED's 20 formed thereon. At the array face 310, the PED's 20 are parallel and spaced apart from immediately neighboring PED's by a distance equal to the pitch $\Delta R$ of the tracks on the disk. Using such a read/write head array 300, a plurality of light beams, $I_1, I_2, \ldots, I_N$, may be transmitted through the array 300, one light beam per read/write head 100 in the array.

Figure 3B:
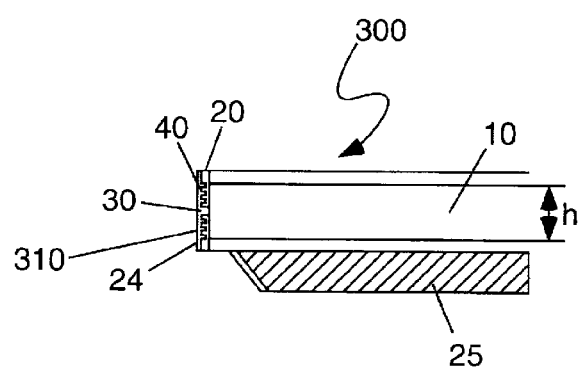
FIG. 3B is a cross-sectional view of the device of FIG. 3A taken through the longitudinal axis of one of the waveguides.

FIG. 3B is a cross-sectional view of the read/write head array 300 of FIG. 3A, taken through the longitudinal axis of one of the waveguides 10. The device is coated with overlayer 24 as described above for protecting the read/write heads and for further enhancing the transmission through the PED 20. Accordingly, the overlayer 24 preferably exhibits high hardness and preferably has an index of refraction which is substantially equal to that of the material on which the metal film is deposited (in this case, the waveguide 10 itself, although an intervening material may be used between the waveguide 10 and the metal film 22 if desired. If the read/write head array 300 is to be used as a contact slider head, a lubricant, necessary for the sliding action, should be selected with an appropriate refractive index that matches that of either the overlayer 24 if present (so as to minimize reflection at the interface), or (if overlayer 24 is absent) the waveguide 10 (so as to further enhance the optical transmission as described above). Etching the underlying substrate 25 in the vicinity of the array face 310 may be desirable to minimize the total face area to facilitate maintaining the read head within near-field distances of the media.

In a read/write head linear array configuration as shown in FIGS. 3A and 3B, if the center-to-center distance between PED's is $\Delta R=1.6$ μm (which reflects the track pitch for current optical storage media such as CD-ROM or DVD), there will be no crosstalk between neighboring read/write heads. In a sample in which the position of the PED apertures with respect to the surface features is varied across the sample, the light transmitted through the sample is varied accordingly on a length scale of 2 μm, evincing the highly local nature of the transmission enhancement. See U.S. Pat. No. 6,236,033 to Ebbesen et al. Moreover, it has been shown that only one or two "shells" of nearest-neighbor surface features (e.g. dimples) is sufficient to obtain the full transmission enhancement. See Thio et al., supra. The term "shell" is well-known in the art of solid-state physics. Each shell comprises a group of surface features positioned at the same distance from the aperture. For example, for a square array, the first shell comprises the nearest surface feature neighbors (in this case, four surface features forming the corners of a square). The second shell comprises the next-nearest surface feature neighbors (in this case, the four surface features on the diagonal), and so forth. For example, if a red laser is used (λ=635 nm) with circular apertures and dimples as surface features provided on the surface of the metal film adjacent to the waveguide, the distance between an aperture and the neighboring surface feature (a dimple in this case) in each PED should be about (600/n) nm, where n is the refractive index of the dielectric material adjacent to the surface features on metal film 22 (for example, the overlayer 24 if the surface features are on that side of the metal film 22). This can be accommodated in the 0.8 μm distance to the midpoint between two immediately neighboring circular apertures. Taking the index of refraction of the waveguide into account, the dimple period should be 0.2 μm, so that several shells of surface feature neighbors can be accommodated around each aperture. In order to further decrease crosstalk, apertures can be alternately optimized for different wavelengths, for instance 635 nm and 830 nm, as described in U.S. Pat. No. 6,236,033 to Ebbesen et al.

Figure 4:
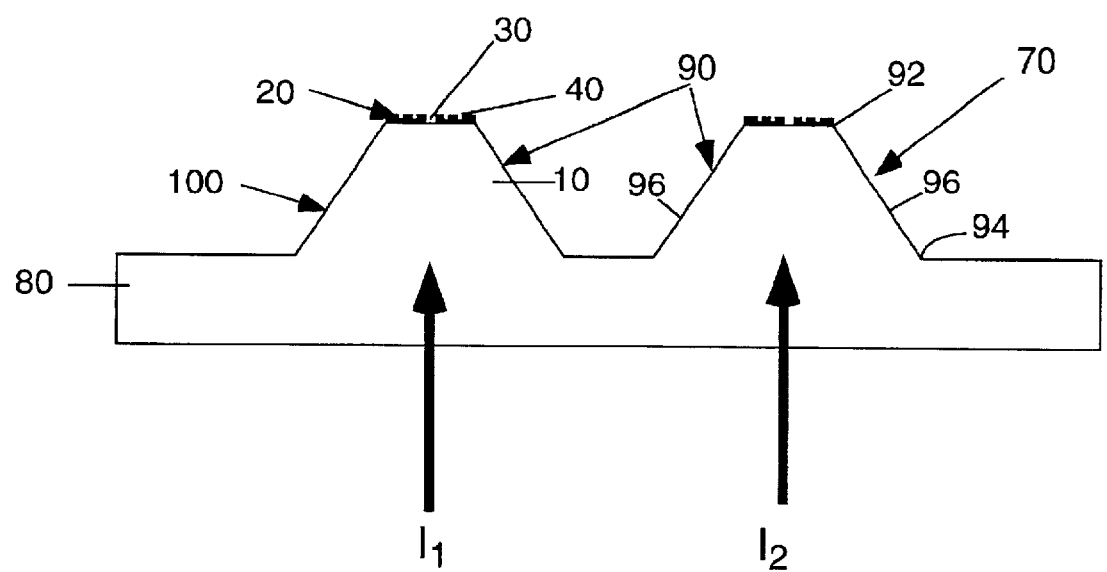
FIG. 4 is a cross-sectional view of an array of read/write heads constructed from a plurality of frustum structures fabricated from a semiconductor wafer, each of which is provided with a PED, in accordance with the present invention.

An alternative geometry for fabricating arrays of subwavelength apertures, and therefore arrays of read/write heads, is an array of frustum structures fabricated on a semiconductor wafer. As shown in FIG. 4, an optically transparent semiconductor wafer 80, such as a silicon or GaAs wafer, is etched (preferably with an anisotropic etch as known in the art) so as to create one or more frustum structures 90, each of which serves as a waveguide for a read/write head. These frustum structures may be generally thought of as pyramidal structures which do not include an apex. Each frustum structure 90 includes a substantially flat top surface 92 with a PED provided thereupon as shown, as well as a base 94 and a plurality of facets 96. The frustum structure preferably has a square base (and therefore four facets), although other frustum base shapes (such as triangular, in which case the frustum would have three facets, for example) may be employed. It has been shown that these frustum structures focus light transmitted incident in plane waves on the base of the frustum structure (as shown by the light beams $I_1$ and $I_2$ in the example of FIG. 4) at a height just below where the apex of the pyramid would be positioned if the frustum was a pyramid and the apex of the pyramid was present. The frustum is terminated at that height, and high throughput is provided for light incident on the base of the frustum (for example, from a VCSEL constructed below the frustum). By providing a PED 20 on the top surface of each frustum structure as shown, the high throughput is enhanced even further in the same manner as described above. The resolution of such a device is determined by the size of the aperture 30 in the metallic layer of the PED. Arrays of such frustum structures can be fabricated in a straightforward way. This is particularly useful in the case that the light source is an array of vertical cavity surface-emitting lasers ("VCSEL"s; see below) which may be fabricated underneath the frustums as has been recently demonstrated by Heisig et al. See S. Heisig et al., "Optical Active Gallium Arsenide Cantilever Probes for Combined Scanning Near-Field Optical Microscopy and Scanning Force Microscopy," *Journal Vac. Sci. Technology B*, Vol. 18, No. 3, pp. 1134–1137 (2000); S. Heisig et al., "Gallium Arsenide Probes for Scanning Near-Field Probe Microscopy," *Applied Physics A*, Vol. 66, pp. S385–S390 (1998).

Generally, high-index semiconductor pyramid structures are known to concentrate the light incident on their bases at a position slightly below the very apex. See K Iga, "Surface Emitting Lasers," *Electronics and Communications in Japan*, Part 2, Vol. 82, No. 10, pp. 70–82 (1999); K Goto, "Proposal of Ultrahigh Density Optical Disk System Using a Vertical Cavity Surface Emitting Laser Array," *Japanese Journal of Applied Physics*, Vol. 37, Part 1, No. 4B, pp. 2274–2278 (1998); Y.-J. Kim et al., "Fabrication of Micro-Pyramidal Probe Array with Aperture for Near-Field Optical memory Applications," *Japanese Journal of Applied Physics*, Vol. 39, Part 1, No. 3B, pp. 1538–1541 (2000). In the present invention, to obtain the highest possible throughput while maintaining high resolution, it is preferable that each frustum structure 90 is constructed so that the top surface 92 is provided at the position of highest light intensity, and a PED 20 is provided on that top surface with a subwavelength aperture 30 which matches the desired resolution of the read/write head as described above. This multichannel device has the advantage that frustum structures can be fabricated with excellent height uniformity (that is, the height at which the flat top surface 92 is positioned), and therefore are suitable for use even in contact slider heads which have the strictest requirements for such uniformity.

Arrays of read/write heads constructed in accordance with the present invention thus permit both reading and writing through each head, which is a significant advantage. Separate read and write heads are typically not required, thereby eliminating the difficulties associated with aligning separate read and write heads. For read/write heads of the present invention fabricated with optical fiber waveguides, with an input power of 100 mW and a fiber core diameter of 3–4 µm, it is possible, especially if a dielectric overlayer 24 is used with a matching refractive index as described above to further enhance the optical transmission, to obtain output power densities of about $10^{10}$ W/m$^2$, which is comparable to power densities used in current write-heads for optical media. It is possible to further boost the output power density by using optical fibers for waveguides with a smaller core, or by tapering the end of the optical fiber or other waveguide slightly so that the light is confined within a smaller area, thereby increasing the power density. As mentioned above, frustum structures in semiconductors can also be used to concentrate the light intensity at the output face.

Although it is convenient for some applications to use a read/write head which is separate from the light source or detector as shown in FIGS. 1–3, it may be advantageous for certain other applications to have the light source be an integral part of the read/write head. One way to achieve this very tight configuration is to utilize a configuration demonstrated by Partovi et al. who have fabricated a pinhole aperture in the output mirror of a semiconductor laser. A. Partovi et al., "High-Power Laser Light Source for Near-Field Optics and its Application to High-Density Optical Data Storage," *Applied Physics Letters*, Vol. 75, No. 11, pp. 1515–1517 (1999). The diameter of the aperture can be chosen to be well below the optical wavelength. If the material of the output mirror is a metal, the transmission through the subwavelength output aperture is expected to be very small, and to decrease with decreasing output diameter d as $-(d/\lambda)^4$, where $\lambda$ is the optical wavelength. See H. A. Bethe, *Physical Review*, Vol. 66, Nos. 7 and 8, pp. 163–182 (1944). In accordance with the present invention, the output coupling of such a laser can be enhanced significantly by the use of surface plasmon enhanced transmission through the output aperture.

Figure 5:
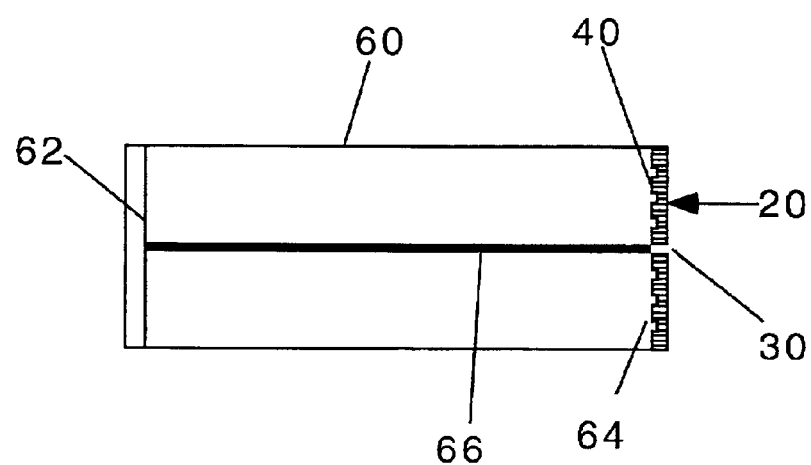
FIG. 5 is a cross-sectional view of a laser constructed in accordance with the present invention including a cavity mirror having a small aperture which exhibits surface plasmon enhanced transmission.

FIG. 5 shows schematically a laser 60 constructed in accordance with the present invention, including a cavity defined by a rear mirror 62 and a front, output mirror 64 in which an aperture 30 allows the laser light to be coupled out with extremely high resolution. The general construction and operation of lasers is known in the art. However, in the present invention, a periodic surface topography 40 is provided at the interface of the output mirror with the laser to create a PED 20 which enhances the transmission efficiency of the light emerging from the output aperture. The periodicity of the surface features of the periodic surface topography should be chosen to match the laser wavelength, according to the dispersion of the surface plasmons and the grating coupling to the periodic surface topography. See Ghaemi et al., supra. The laser itself may be any laser, including any conventional laser. For example, the laser could be a gas laser (such as Ar, $N_2$, $CO_2$, HeNe), in which one of the cavity mirrors has the subwavelength output aperture with surrounding periodic surface topography. Another possibility is a solid-state laser (such as ruby, YAG, Ti:sapphire) with a similarly modified output coupler; here the output coupler may be fabricated directly onto the face of the gain medium. The laser could also be a fiber laser in which the back mirror may consist of a fiber grating. Any laser is encompassed by the invention. It is to be noted that in these embodiments, in which the light source is an integral part of the read/write head, the light source may be used either to write to the optical storage medium, or to illuminate the optical storage medium so that the reflected or refracted light from such illumination may be collected by a light collector which may be positioned on either side of the optical storage medium or as a combined light source and detector. The detector or light collector may operate in either near-field or far-field mode.

Figure 6A:
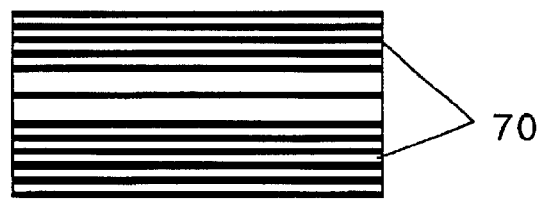
FIG. 6A is a cross-sectional view of a prior art vertical cavity surface emitting laser (VCSEL) including a cavity defined by distributed Bragg reflectors (DBRs)
Figure 6B:
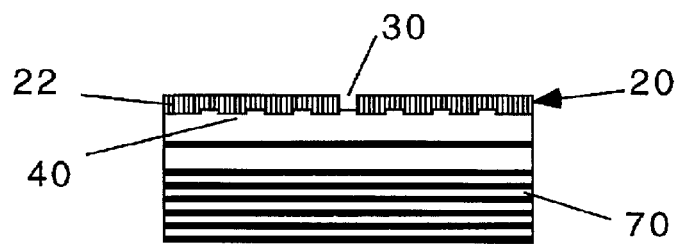
FIG. 6B is a cross-sectional view of an improved VCSEL constructed in accordance with the present invention in which the VCSEL includes an output coupler with an enhanced transmission subwavelength aperture.
Figure 6C:
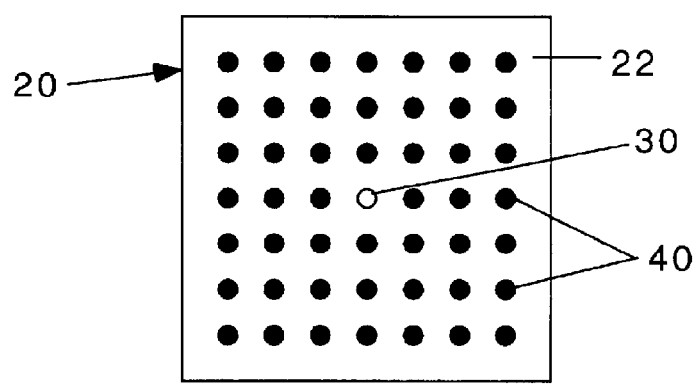
FIG. 6C is a plan view of the improved VCSEL of FIG. 5B showing the sub-wavelength aperture and the surface features in the top metal mirror.
Figure 6D:
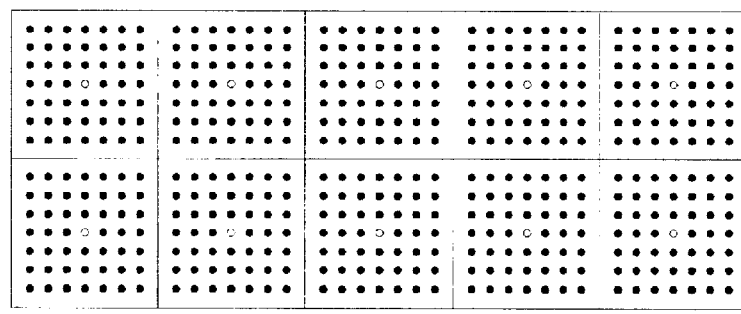
FIG. 6D is a plan view of an array of improved VCSELs constructed in accordance with the present invention.

The most preferable lasers for the read/write heads of the present invention are semiconductor lasers. These may be side-emitting (as shown in FIG. 5, for example), in which case the light is confined in the z direction to a heterojunction or quantum well 66. Even more attractive alternatives are vertical cavity surface-emitting lasers ("VCSELs") as shown in FIG. 6A. Generally, the VCSEL cavity is defined by two distributed Bragg reflectors ("DBRs") 70 consisting of GaAs/AlGaAs multilayers of which the structure is matched to the laser wavelength as is well-known in the art. To obtain subwavelength resolution with high throughput (see FIG. 6B), the front DBR 70 may be replaced by a PED 20, including a metal film reflector 22 in which is fabricated (see FIGS. 6B, 6C) a subwavelength-diameter aperture 30 surrounded by a periodic surface topography 40. A very attractive feature of VCSELs is that fabrication in large arrays is straightforward. FIG. 6D shows a top or plan view of a VCSEL array of which each output is provided with a PED including an enhanced transmission subwavelength aperture. The considerations for the spacing between VCSEL are the same as those described above for the read/write head array (see FIG. 3), except that in practice all the elements of the VCSEL array will operate at the same wavelength, and the spacing may be limited by the requirements on the lateral dimensions of each VCSEL.

While there has been described and illustrated various optical storage read/write heads with enhanced transmission for use in certain applications, it will be apparent to those skilled in the art that variations and modifications are possible without deviating from the spirit and broad teachings of the invention which shall be limited solely by the scope of the claims appended hereto.

What is claimed is:

1. A read/write head for an optical storage medium comprising:

a waveguide having an end face; and a plasmon-enhanced device provided on the end face of the waveguide, the plasmon-enhanced device comprising a metal film having a first surface and a second surface, the first surface being fixed to the waveguide end face, the metal film having an aperture provided therethrough, and the metal film having a periodic surface topography provided on at least one of the first and second surfaces of the metal film, whereby light incident on one of the surfaces of the metal film interacts with a surface plasmon mode on at least one of the surfaces of the metal film thereby enhancing transmission of light through the aperture in the metal film which is directed onto and/or collected from the optical storage medium.

2. The read/write head of claim 1, wherein the second surface of the metal film is positioned in close proximity to the optical storage medium so as to perform at least one of a read operation from and a write operation to the optical storage medium utilizing light transmitted through the read/write head.

3. The read/write head of claim 2, wherein light is transmitted from the waveguide through the plasmon-enhanced device such that light of enhanced transmission is directed onto the optical storage medium to perform a write operation on the optical storage medium.

4. The read/write head of claim 2, wherein light is transmitted from the waveguide through the plasmon-enhanced device such that light of enhanced transmission is directed onto the optical storage medium to illuminate the optical storage medium to perform a read operation from the optical storage medium.

5. The read/write head of claim 2, wherein light which is reflected by, refracted by or transmitted through the optical storage medium is transmitted through the plasmon-enhanced device and into the waveguide with enhanced transmission to perform a read operation from the optical storage medium.

6. The read/write head of claim 1, wherein the periodic surface topography comprises a plurality of surface features.

7. The read/write head of claim 6, wherein the surface features are selected from the group consisting of dimples, semi-spherical protrusions, grooves, ribs, concentric depressed rings and concentric raised rings.

8. The read/write head of claim 1, wherein the periodic surface topography is provided only on the first surface of the metal film.

9. The read/write head of claim 1, wherein the periodic surface topography is provided on both the first surface and the second surface of the metal film.

10. The read/write head of claim 1, wherein the waveguide is an optical fiber.

11. The read/write head of claim 1, wherein the waveguide is a substantially rigid optically transparent semiconductor.

12. The read/write head of claim 11, wherein the waveguide comprises a frustum structure having a base, a substantially flat top surface and a plurality of facets, each facet being a substantially planar surface extending from the base to the substantially flat top surface, wherein the plasmon-enhanced device is provided on the flat top surface of the frustum structure.

13. The read/write head of claim 12, wherein the base of the frustum structure is a square and the frustum includes four facets.

14. The read/write head of claim 1, wherein the aperture is cylindrically shaped.

15. The read/write head of claim 1, wherein the aperture is slit-shaped.

16. The read/write head of claim 1, further comprising an optically transparent overlayer fixed to the second surface of the metal film.

17. The read/write head of claim 16, wherein the waveguide has a refractive index and the overlayer has a refractive index, and wherein the refractive index of the overlayer is substantially equal to the refractive index of the waveguide.

18. The read/write head of claim 1, further comprising a light source integral to the read/write head.

19. An array of precisely aligned read/write heads for an optical storage medium comprising:
   a plurality of waveguides, each waveguide having an end face, and all end faces being positioned substantially in the same plane; and
   a plasmon-enhanced device provided on the end face of each waveguide, each plasmon-enhanced device comprising a metal film having a first surface and a second surface, the first surface being fixed to the corresponding waveguide end face, the metal film having an aperture provided therethrough, and the metal film having a periodic surface topography provided on at least one of the first and second surfaces of the metal film, whereby light incident on one of the surfaces of the metal film interacts with a surface plasmon mode on at least one of the surfaces of the metal film thereby enhancing transmission of light through the aperture in the metal film which is directed onto and/or collected from the optical storage medium.

20. The array of precisely aligned read/write heads of claim 19, wherein the second surface of each metal film is positioned in close proximity to the optical storage medium so as to perform at least one of a read operation from and a write operation to the optical storage medium utilizing light transmitted through the read/write head corresponding to such metal film.

21. The array of precisely aligned read/write heads of claim 20, wherein light is transmitted from each waveguide through the corresponding plasmon-enhanced device such that light of enhanced transmission is directed onto the optical storage medium to perform a write operation on the optical storage medium.

22. The array of precisely aligned read/write heads of claim 20, wherein light is transmitted from each waveguide through the corresponding plasmon-enhanced device such that light of enhanced transmission is directed onto the optical storage medium to illuminate the optical storage medium to perform a read operation from the optical storage medium.

23. The array of precisely aligned read/write heads of claim 20, wherein light which is reflected by, refracted by or transmitted through the optical storage medium is transmitted through at least one of the plurality of plasmon-enhanced devices and into the corresponding waveguide with enhanced transmission to perform a read operation from the optical storage medium.

24. The array of precisely aligned read/write heads of claim 19, wherein the periodic surface topography comprises a plurality of surface features.

25. The array of precisely aligned read/write heads of claim 24, wherein the surface features are selected from the group consisting of dimples, semi-spherical protrusions, grooves, ribs, concentric depressed rings and concentric raised rings.

26. The array of precisely aligned read/write heads of claim 19, wherein the periodic surface topography is provided only on the first surface of the metal film.

27. The array of precisely aligned read/write heads of claim 19, wherein the periodic surface topography is provided on both the first surface and the second surface of the metal film.

28. The array of precisely aligned read/write heads of claim 19, wherein each waveguide is an optical fiber.

29. The array of precisely aligned read/write heads of claim 19, wherein each waveguide is a substantially rigid optically transparent semiconductor.

30. The array of precisely aligned read/write heads of claim 19, wherein each aperture is cylindrically shaped.

31. The array of precisely aligned read/write heads of claim 19, wherein each aperture is slit-shaped.

32. The array of precisely aligned read/write heads of claim 19, further comprising an optically transparent overlayer fixed to the second surface of the metal film of each plasmon-enhanced device.

33. The array of precisely aligned read/write heads of claim 32, wherein each waveguide has a refractive index and the overlayer of each plasmon-enhanced device has a refractive index, and wherein the refractive index of the overlayer of each plasmon-enhanced device is substantially equal to the refractive index of the waveguide corresponding to that plasmon-enhanced device.

34. The array of precisely aligned read/write heads of claim 19, wherein a unitary metal film comprises the metal film of each of the plurality of plasmon-enhanced devices.

35. The array of precisely aligned read/write heads of claim 19, wherein the plurality of waveguides are formed from a single substantially rigid optically transparent semiconductor wafer.

36. The array of precisely aligned read/write heads of claim 35, wherein the plurality of waveguide end faces are cleaved so as to provide smoothness and precise alignment.

37. The array of precisely aligned read/write heads of claim 35, wherein each of the plurality of waveguides comprises a frustum structure having a base, a substantially flat top surface and a plurality of facets, each facet being a substantially planar surface extending from the base to the substantially flat top surface, wherein each plasmon-enhanced device is provided on the flat top surface of the frustum structure.

38. The array of precisely aligned read/write heads of claim 37, wherein the base of the frustum structure is a square and the frustum includes four facets.

39. The array of precisely aligned read/write heads of claim 19, further comprising a light source integral to each read/write head.

40. A read/write head for an optical storage medium comprising:
    a light source for directing light toward the optical storage medium;
    a plasmon-enhanced device provided between the light source and the optical storage medium, the plasmon-enhanced device comprising a metal film having a first surface and a second surface, the first surface being disposed toward the light source and the second surface being disposed toward the optical storage medium, the metal film having an aperture provided therethrough, and the metal film having a periodic surface topography provided on at least one of the first and second surfaces of the metal film, whereby light from the light source incident on the first surface of the metal film interacts with a surface plasmon mode on at least one of the surfaces of the metal film thereby enhancing transmission of the light through the aperture in the metal film which is directed onto the optical storage medium.

41. The read/write head of claim 40, wherein the light source comprises a laser.

42. The read/write head of claim 41, wherein the laser is selected from the group consisting of a semiconductor laser, a side-emitting semiconductor laser, a vertical cavity surface emitting laser (VCSEL), a solid-state laser and a fiber laser.

43. The read/write head of claim 41, wherein the laser comprises a vertical cavity surface emitting laser (VCSEL) including a vertical cavity defined by a rear distributed Bragg deflector (DBR) and the plasmon-enhanced device.

44. The read/write head of claim 41, wherein the laser comprises an output mirror and a rear mirror, and wherein the plasmon-enhanced device is provided on the output mirror.

45. The read/write head of claim 40, further comprising a light collector for collecting light from the light source which has been enhanced by the plasmon-enhanced device and is reflected by, refracted by or transmitted through the optical storage medium.

46. The read/write head of claim 45, wherein the light collector collects the light in a near-field mode.

47. The read/write head of claim 45, wherein the light collector collects the light in a far-field mode.

48. The read/write head of claim 45, wherein the light collector is positioned on the same side of the optical storage medium as the light source.

49. The read/write head of claim 45, wherein the light collector is positioned on the opposite side of the optical storage medium as the light source.

50. The read/write head of claim 40, wherein the periodic surface topography comprises a plurality of surface features.

51. The read/write head of claim 50, wherein the surface features are selected from the group consisting of dimples, semi-spherical protrusions, grooves, ribs, concentric depressed rings and concentric raised rings.

52. The read/write head of claim 40, wherein the periodic surface topography is provided only on the first surface of the metal film.

53. The read/write head of claim 40, wherein the periodic surface topography is provided on both the first surface and the second surface of the metal film.

54. The read/write head of claim 40, wherein the aperture is cylindrically shaped.

55. The read/write head of claim 40, wherein the aperture is slit-shaped.

56. The read/write head of claim 40, further comprising an optically transparent overlayer fixed to the second surface of the metal film.

57. An array of precisely aligned read/write heads for an optical storage medium comprising:
    a plurality of light sources for directing light toward the optical storage medium;
    a plasmon-enhanced device provided between each light source and the optical storage medium, each plasmon-enhanced device comprising a metal film having a first surface and a second surface, the first surface being disposed toward the light source and the second surface being disposed toward the optical storage medium, the metal film having an aperture provided therethrough, and the metal film having a periodic surface topography provided on at least one of the first and second surfaces of the metal film, whereby light from the light source incident on the first surface of the metal film interacts with a surface plasmon mode on at least one of the surfaces of the metal film thereby enhancing transmission of the light through the aperture in the metal film which is directed onto the optical storage medium.

58. The array of precisely aligned read/write heads of claim 57, wherein at least one of the light sources comprises a laser.

59. The array of precisely aligned read/write heads of claim 58, wherein the laser is selected from the group consisting of a semiconductor laser, a side-emitting semiconductor laser, a vertical cavity surface emitting laser (VCSEL), a solid-state laser and a fiber laser.

60. The array of precisely aligned read/write heads of claim 58, wherein the laser comprises a vertical cavity surface emitting laser (VCSEL) including a vertical cavity defined by a rear distributed Bragg deflector (DBR) and the plasmon-enhanced device.

61. The array of precisely aligned read/write heads of claim 58, wherein the laser comprises an output mirror and a rear mirror, and wherein the plasmon-enhanced device is provided on the output mirror.

62. The array of precisely aligned read/write heads of claim 57, further comprising a light collector for collecting light from each light source which has been enhanced by the plasmon-enhanced device and is reflected by, refracted by or transmitted through the optical storage medium.

63. The array of precisely aligned read/write heads of claim 62, wherein the light collector collects the light in a near-field mode.

64. The array of precisely aligned read/write heads of claim 62, wherein the light collector collects the light in a far-field mode.

65. The array of precisely aligned read/write heads of claim 62, wherein the light collector is positioned on the same side of the optical storage medium as the light source.

66. The array of precisely aligned read/write heads of claim 62, wherein the light collector is positioned on the opposite side of the optical storage medium as the light source.

67. The array of precisely aligned read/write heads of claim 57, wherein the periodic surface topography comprises a plurality of surface features.

68. The array of precisely aligned read/write heads of claim 67, wherein the surface features are selected from the group consisting of dimples, semi-spherical protrusions, grooves, ribs, concentric depressed rings and concentric raised rings.

69. The array of precisely aligned read/write heads of claim 57, wherein the periodic surface topography is provided only on the first surface of the metal film.

70. The array of precisely aligned read/write heads of claim 57, wherein the periodic surface topography is provided on both the first surface and the second surface of the metal film.

71. The array of precisely aligned read/write heads of claim 57, wherein each aperture is cylindrically shaped.

72. The array of precisely aligned read/write heads of claim 57, wherein each aperture is slit-shaped.

73. The array of precisely aligned read/write heads of claim 57, further comprising an optically transparent overlayer fixed to the second surface of the metal film of each plasmon-enhanced device.

74. A side-emitting laser comprising:

a rear mirror;

an output mirror;

a quantum well disposed between the rear mirror and the output mirror; and a plasmon-enhanced device provided on the output mirror, the plasmon-enhanced device comprising a metal film having a first surface and a second surface, the first surface being disposed toward the quantum well and the second surface being disposed toward the output of the side-emitting laser, the metal film having an aperture provided therethrough, and the metal film having a periodic surface topography provided on at least one of the first and second surfaces of the metal film, whereby light incident on the first surface of the metal film interacts with a surface plasmon mode on at least one of the surfaces of the metal film thereby enhancing transmission of the light through the aperture in the metal film which is directed out of the side-eitting laser.

75. A vertical cavity surface-emitting laser (VCSEL) comprising:

a rear distributed Bragg deflector (DBR); and a plasmon-enhanced device defining a vertical cavity between the DBR and the plasmon-enhanced device, the plasmon-enhanced device comprising a metal film having a first surface and a second surface, the first surface being disposed toward the cavity and the second surface being disposed toward the output of the VCSEL, the metal film having an aperture provided therethrough, and the metal film having a periodic surface topography provided on at least one of the first and second surfaces of the metal film, whereby light incident on the first surface of the metal film interacts with a surface plasmon mode on at least one of the surfaces of the metal film thereby enhancing transmission of the light through the aperture in the metal film which is directed out of the VCSEL.

76. The read/write head of claim 40, further comprising a waveguide for guiding light from the light source to the plasmon-enhanced device.

77. The array of precisely aligned read/write heads of claim 57, further comprising a waveguide for guiding light from the light source to the plasmon-enhanced device.

* * * * *